(12) United States Patent
Fan et al.

(10) Patent No.: US 11,150,631 B2
(45) Date of Patent: *Oct. 19, 2021

(54) PREDICTIVE MAINTENANCE UTILIZING SUPERVISED SEQUENCE RULE MINING

(71) Applicant: INTERNATIONAL BUSINESS MACHINES CORPORATION, Armonk, NY (US)

(72) Inventors: Lei Fan, Xi'an (CN); Sier Han, Xi'an (CN); Xiao Ming Ma, Xi'an (CN); A Peng Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,383

(22) Filed: May 31, 2019

(65) Prior Publication Data

US 2019/0286101 A1 Sep. 19, 2019

Related U.S. Application Data (63) Continuation of application No. 15/787,732, filed on Oct. 19, 2017.

(51) Int. Cl.
*G05B 19/4065* (2006.01)
*G05B 23/02* (2006.01)

(52) U.S. Cl.
CPC ..... *G05B 19/4065* (2013.01); *G05B 23/0283* (2013.01); *G05B 23/0229* (2013.01); *G05B 2219/32194* (2013.01)

(58) Field of Classification Search
CPC .......................... G05B 19/4065; G05B 23/0283
See application file for complete search history.

(56) References Cited

U.S. PATENT DOCUMENTS 7,292,960 B1 11/2007 Srinivasa
2005/0283680 A1* 12/2005 Kobayashi .......... G06F 11/3636
714/39

(Continued)

FOREIGN PATENT DOCUMENTS

WO 20120374292 A2 3/2012
WO 20141693771 A1 10/2014

OTHER PUBLICATIONS

Sammouri Data mining of temporal sequences for the prediction of infrequent failure events : application on floating train data for predictive maintenance. Signal and Image processing. University Paris-Est, 2014. English.

(Continued)

*Primary Examiner* — Lisa E Peters
(74) *Attorney, Agent, or Firm* — Stephen R. Yoder (57) ABSTRACT

Statistically significant event patterns predict the timing for performing entity maintenance. Event patterns are determined based on a target variable having an undesired value for a given entity when the event pattern occurs. Event patterns are filtered based on distributions of the event patterns across multiple entities and distributions of event patterns during desired operation of the entities and undesired operation of the entities. A predictive maintenance process is established having significant event patterns as the basis for maintenance tasks.

8 Claims, 4 Drawing Sheets

(56) References Cited

U.S. PATENT DOCUMENTS

| | | | |
|---|---|---|---|
| 2006/0116921 A1* | 6/2006 | Shan | G06Q 10/063 705/7.11 |
| 2007/0088550 A1* | 4/2007 | Filev | G06K 9/6298 704/245 |
| 2009/0204237 A1* | 8/2009 | Sustaeta | G05B 13/0285 700/36 |
| 2011/0099136 A1* | 4/2011 | Barajas | G06F 17/18 706/13 |
| 2011/0279458 A1* | 11/2011 | Gnanasambandam | G06Q 30/0238 345/440 |
| 2012/0054246 A1* | 3/2012 | Fischer | G06F 16/319 707/793 |
| 2013/0332240 A1 | 12/2013 | Patri | |
| 2014/0115002 A1* | 4/2014 | Kocher | G06F 11/3013 707/776 |
| 2016/0342903 A1* | 11/2016 | Shumpert | G06F 11/079 |
| 2017/0091654 A1* | 3/2017 | Singh | G06N 7/005 |
| 2017/0155674 A1* | 6/2017 | Seo | H04L 63/1425 |
| 2017/0228253 A1* | 8/2017 | Layman | G06F 11/30 |
| 2018/0075235 A1* | 3/2018 | Tajima | G06F 21/554 |
| 2018/0157983 A1* | 6/2018 | Guruswamappa | G06F 11/3466 |
| 2019/0121318 A1 | 4/2019 | Fan | |

OTHER PUBLICATIONS

Appendix P—List of IBM Patents or Patent Applications Treated as Related, Filed herewith, 2 Pages.

\* cited by examiner

| RULE TYPE | RULE | CONFIDENCE VALUE |
|---|---|---|
| 1-LEVEL-RULE | A | 0.7 |
| | B | 0.6 |
| | C | 0.7 |
| 2-LEVEL-RULE | B → A | 0.5 |
| | C → A | 0.3 |
| 3-LEVEL-RULE | B → A → C | 0.3 |
| | A → B → C | 0.4 |

FIG. 4

PREDICTIVE MAINTENANCE UTILIZING SUPERVISED SEQUENCE RULE MINING

BACKGROUND

The present invention relates generally to the field of data processing, and more particularly to predictive maintenance utilizing data mining.

Data mining is the computing process of discovering patterns in large data sets. The overall goal of the data mining process is to extract information from a data set and transform it into an understandable structure for further use. Sequential pattern mining is a topic of data mining concerned with finding statistically relevant patterns between data examples where the values are delivered in a sequence. Applications of sequential pattern mining include medical treatment assistance, natural disaster prediction, stocks and financial market analysis, DNA sequencing, and gene structuralizing.

Predictive maintenance techniques are designed to help determine the condition of in-service equipment in order to predict when maintenance should be performed. This approach promises cost savings over routine or time-based preventive maintenance, because tasks are performed only when warranted. Preventive maintenance is characterized by periodic maintenance operations in order to avoid equipment failures or machinery breakdowns, determined through optimal preventive maintenance scheduling using a wide range of models describing the degrading process of equipment, cost structure, and admissible maintenance actions.

SUMMARY

In one aspect of the present invention, a computer-implemented method, a computer program product, and a system for establishing a predictive maintenance process includes: determining a target variable for a process to be performed by a plurality of entities; collecting event data from the plurality of entities while performing the process, the event data including data time stamps; storing, in a database, the event data; recording to the database a set of values of the target variable during the process, the values including value time stamps; assigning to each entity a set of entity data from the collected event data, each set of entity data corresponding to the entity from which the event data was collected; identifying desired periods of time when the set of values meet a desired value range of the target variable and undesired periods of time when the set of values do not meet the desired value range based on the value time stamps; associating the desired periods of time with collected event data having corresponding data time stamps, the associated event data being produced during periods of time when the value of the target variable is desired; storing the associated event data produced during periods of time when the value of the target variable is desired in the database as desired result data; associating the undesired periods of time with collected event data having corresponding data time stamps, the associated event data being produced during periods of time when the value of the target variable is undesired; storing the associated event data produced during periods of time when the value of the target variable is undesired in the database as undesired result data; mining for a set of sequence rules within the undesired result data for each entity, the sequence rules being based on a chronological order of data time stamps; identifying a subset of sequence rules having a uniform occurrence among the plurality of entities; selecting a set of candidate sequence rules from the subset of sequence rules based on a non-uniform distribution of the set of candidate sequence rules within the desired result data for each entity; and recording a set of significant sequence rules from the set of candidate sequence rules as a set of predictive maintenance rules for a predictive maintenance process based on a disparate distribution of the set of significant sequence rules when comparing distributions of the occurrence of candidate sequence rules in desired result data and undesired result data.

DETAILED DESCRIPTION

Statistically significant event patterns predict the timing for performing entity maintenance. Event patterns are determined based on a target variable having an undesired value for a given entity when the event pattern occurs. Event patterns are filtered based on distributions of the event patterns across multiple entities and distributions of event patterns during desired operation of the entities and undesired operation of the entities. A predictive maintenance process is established having significant event patterns as the basis for maintenance tasks. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
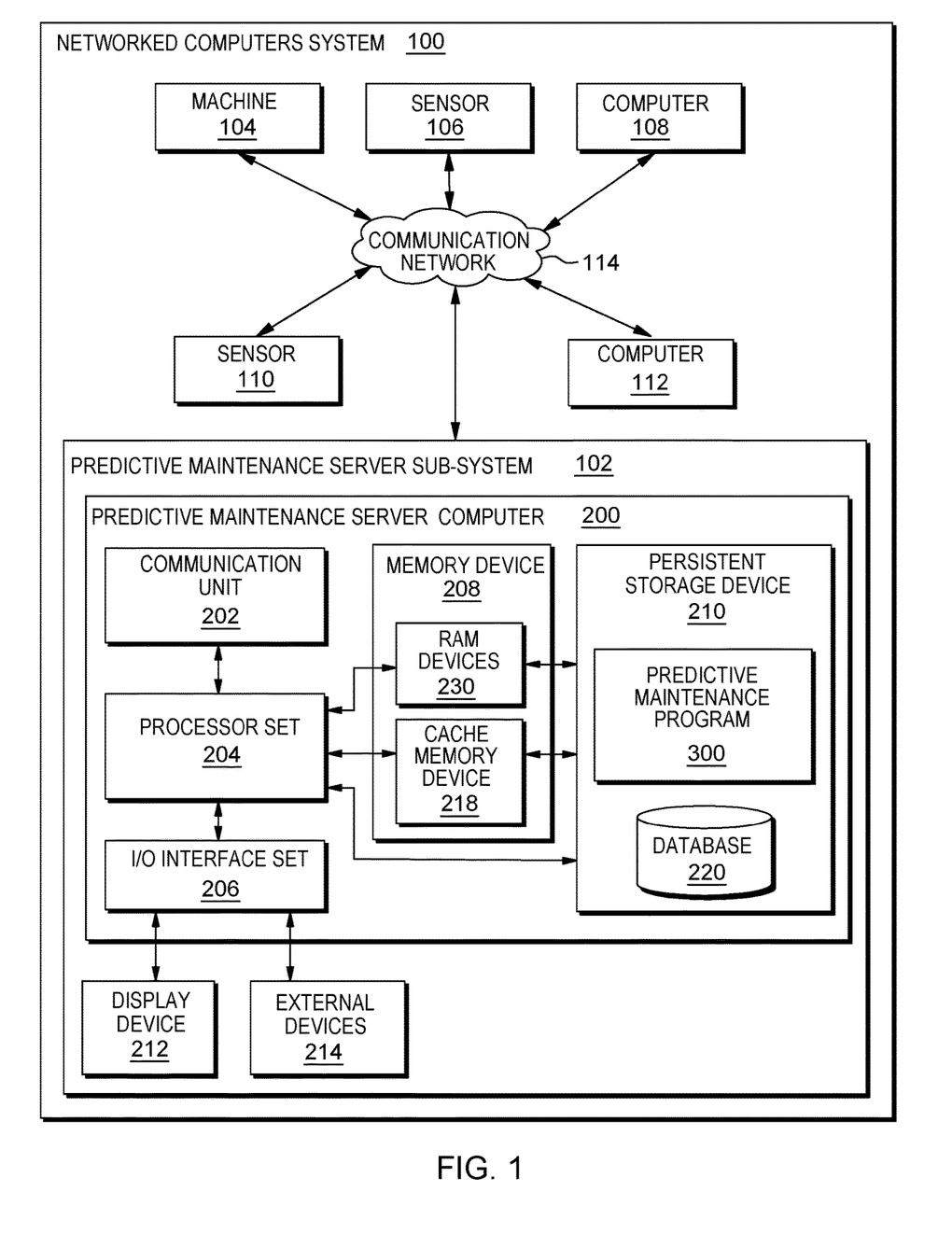
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: predictive maintenance server sub-system 102; machine 104, sensor 106, computer 108, sensor 110, computer 112; and communication network 114. Predictive maintenance server sub-system 102 contains: predictive maintenance server computer 200; display device 212; and external devices 214. Predictive maintenance server computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: predictive maintenance program 300 and database 220.

Predictive maintenance server sub-system 102 is, in many respects, representative of the various computer sub-systems in the present invention. Accordingly, several portions of predictive maintenance server sub-system 102 will now be discussed in the following paragraphs.

Predictive maintenance server sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Predictive maintenance program 300 is a collection of machine readable instructions and/or data that is used to create, manage, and control certain software functions that will be discussed in detail, below, in the Example Embodiment sub-section of this Detailed Description section.

Predictive maintenance server sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Predictive maintenance server sub-system 102 is shown as a block diagram with many double arrows. These double arrows (no separate reference numerals) represent a communications fabric, which provides communications between various components of predictive maintenance server sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for predictive maintenance server sub-system 102; and/or (ii) devices external to predictive maintenance server sub-system 102 may be able to provide memory for predictive maintenance server sub-system 102.

Predictive maintenance program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Predictive maintenance program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to predictive maintenance server sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with predictive maintenance server computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., predictive maintenance program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
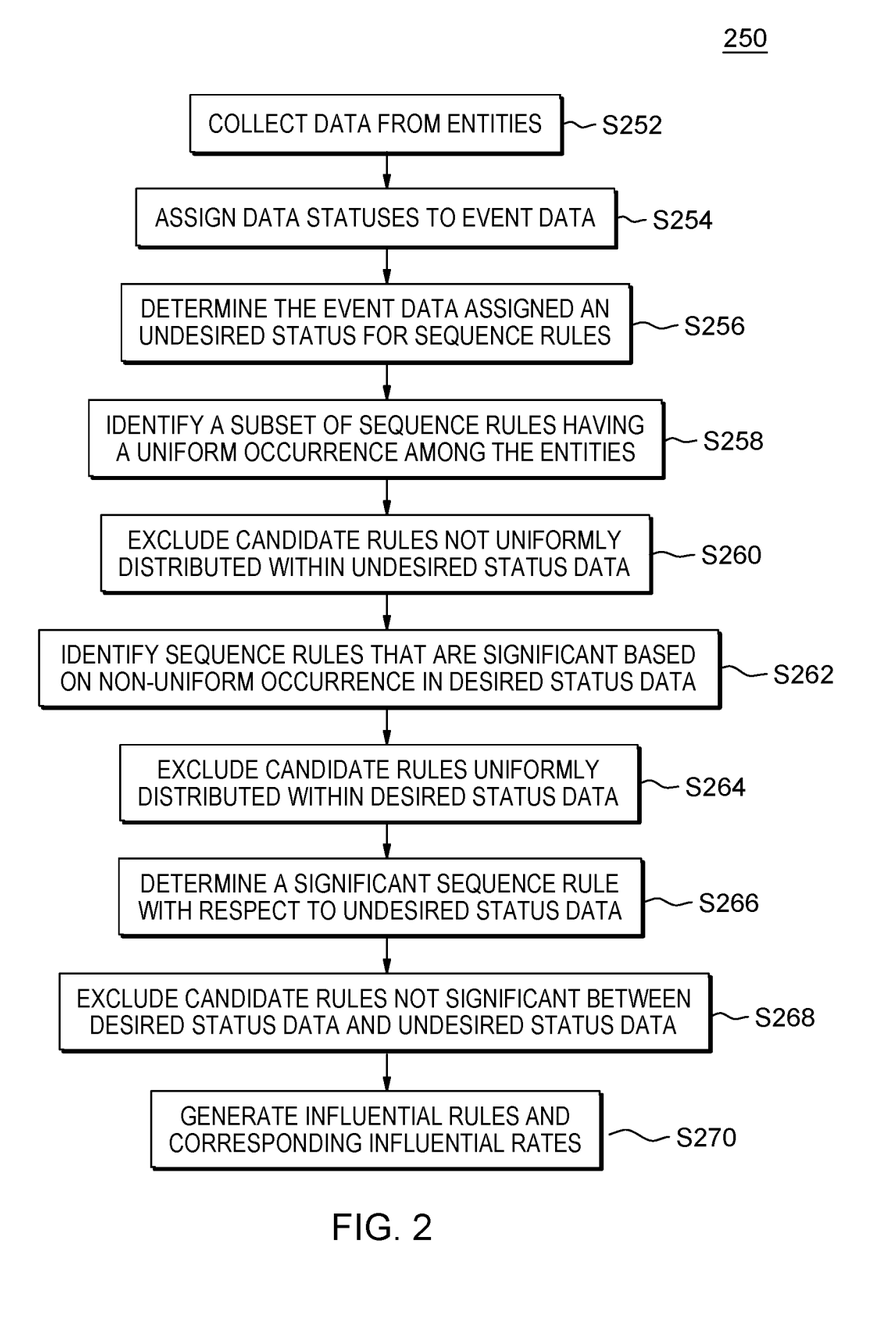
FIG. 2 is a flowchart showing a first embodiment method performed, at least in part, by the first embodiment system.
Figure 3:
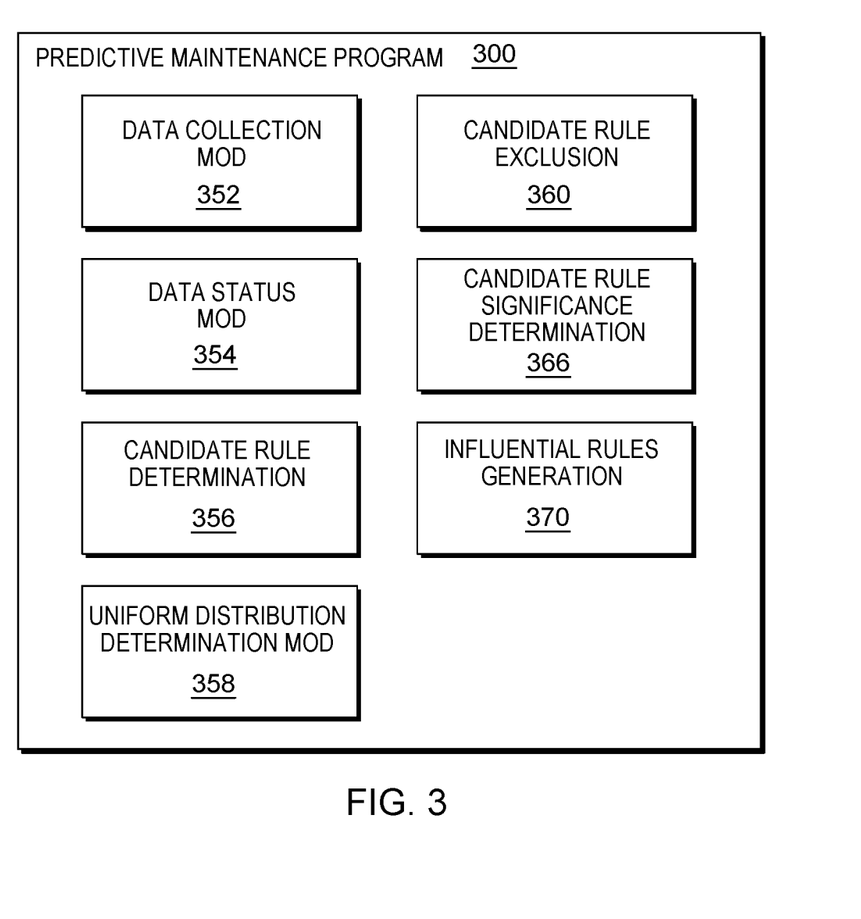
FIG. 3 is a block diagram view of a machine logic (e.g., software) portion of the first embodiment system.

FIG. 2 shows flowchart 250 depicting a method according to the present invention. FIG. 3 shows predictive maintenance program 300, which performs at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S252, where data collection module ("mod") 352 collects data from entities and stores the data in database 220. Data stored in the database includes timestamps for when the data is collected and is assigned in the next step a "data status." Entities are any device that produces measured data, such as machine 104 (see FIG. 1). Data may be collected from entities by data collection devices such as sensor 106, computer 108, sensor 110, and computer 112. The data may also be collected by user input. The data collected for predictive maintenance program 300 is, in some embodiments of the present invention, from systems monitoring functions and conditions of entities where a vast amount of data is generated such that it is difficult to maintain the data manually. In this embodiment, several entities at a chemical plant are monitored during production of a chemical compound. Sensors monitor pipe flow, temperature, and pressure, while computers monitor adsorption rate, distillation rate, evaporation rate, and sublimation rate. These sensors and computers are automated to collect entity data at regular intervals and to send the entity data to predictive maintenance program 300 upon collection.

Processing proceeds to operation S254, where data status mod 354 determines a data status where the status is either desired or undesired according to whether the entity associated with the data is operating desirably with respect to a value of a target variable. During a time when the value of the target variable is desired, data collected corresponds to desired-status data. When the value is not desired, data collected corresponds to undesired status data. The determined data status is assigned to the data in the database according to the determination. Each entity produces at various times desired and undesired values for the target variable depending on individual operation of the entity. Data is divided according to desired and undesired statuses based on pre-defined target variables that distinguish the data by status of an entity. For example, a particular target variable is introduced to correspond to a particular event status, whether desired or undesired. Data assigned a desired status is indicative of a desired event status associated with the entity from which the data is collected. Data assigned an undesired status is indicative of an undesired event status associated with the entity from which the data is collected. Target variables are generated from analysis of conditions existing during desired and undesired events with respect to the target variable. For example, the ideal temperature range of a chemical in a tank at the chemical plant is determined to be from 50 degrees Celsius to 120 degrees Celsius. In this example, there are five tanks in the chemical plant. The target variable is the temperature of each tank. A desired status is assigned to collected data when tank temperatures range between 50° C. and 120° C. (the target variable being temperature of the chemical). An undesired status is assigned to collected data when tank temperatures are outside that range. The data collected for the tanks is divided according to the statuses of the tanks with respect to the target variable when the data is collected.

Processing proceeds to operation S256, where candidate rule determination mod 356 determines candidate rules using data assigned an undesired status. A candidate rule is a statistically significant sequence rule that is generated from data having an undesired status. Sequence rules are identified within the undesired status data by applying pattern analysis to perform supervised sequence rule mining. Sequential rule mining is similar to sequential pattern mining except it takes into consideration the probability that a pattern will occur. Supervised sequence rule mining associated sequence rules with a target variable, such as the status being undesired data.

A sequential rule is a rule of the form X→Y where X and Y are sets of items. The rule X→Y is interpreted to mean that if items in set X occur in any order, then the items in set Y will follow in any order. To find sequential rules, two aspects are generally factored in: the support and the confidence. The support of a rule X→Y identifies how many sequences contain the items from set X followed by the items from set Y. The confidence of a rule X→Y is the support of the rule divided by the number of sequences containing the items from set X. It can be understood as the conditional probability $P(Y|X)$ and it may be expressed as a percentage or decimal.

Candidate rules may be determined based on external factors that are inherent in the processes of an entity. A candidate rule that successfully predicts production of undesired status data is called an influential rule. An influential rule is a candidate rule that is determined to be a predictor of an error event and is used to establish a predictive maintenance process that monitors a process for the influential rule. Candidate rules may also be determined by supervised sequence rule mining of event sequences in multiple entities.

Figure 4:
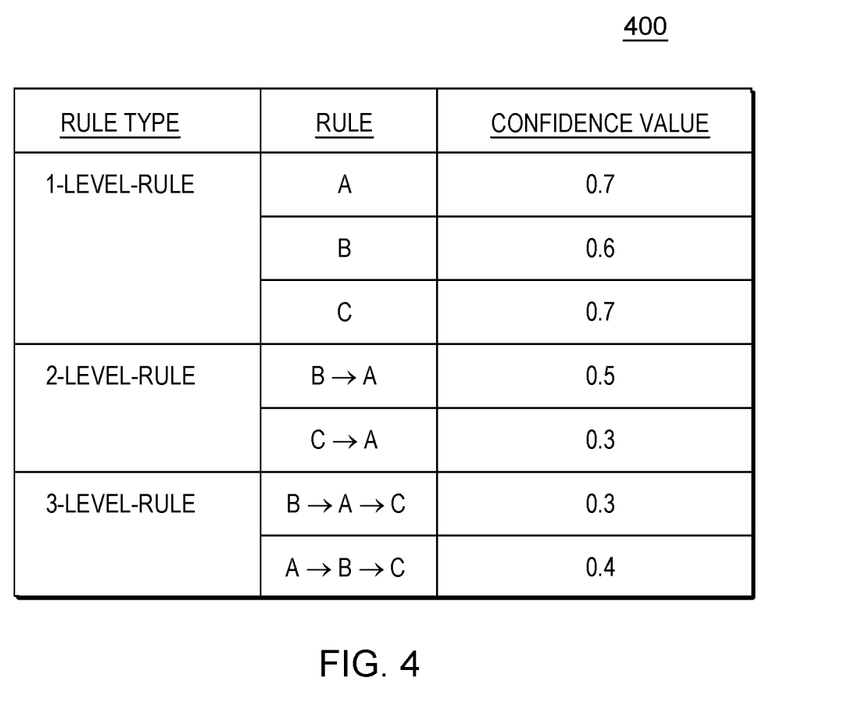
FIG. 4 is a screenshot generated by the first embodiment system.

FIG. 4 is screenshot 400 showing a sample chart of candidate rules and their corresponding support values. These candidate rules are those rules determined to be potentially influential rules to be applied in a predictive maintenance process. Items A, B, and C are unique events among multiple entities. The 1-level-rule type is a rule with one event taking place, A, B, or C. The 2-level-rule type is a rule with two events occurring in a specified order. For example, the rule B→A means event B is followed by event A. The 3-level-rule type is a rule with three events taking place in the rule in a specified order. For example, the rule B→A→C means event B is followed by event A, which is then followed by event C. The confidence value is the conditional probability of the occurrence of the corresponding rule. For example, the rule B→A has a confidence value of 0.5, so every time event B occurs, there is a 50% chance that A occurs subsequently. According to some embodiments of the present invention, candidate rules having higher than average confidence values may be selected as candidate rules by predictive maintenance program 300. Alternatively, predictive maintenance program 300 specifies that sequence rules must have a minimum number of events, or be a specified rule type(s), to be selected as candidate rules. In this embodiment, candidate rules are selected based on analysis of event data generated while a chemical is transported to tanks. The candidate rules are selected by sequential pattern mining of the undesired status data produced as the chemical is processed at the plant. In this example, rules must include at least three events (3-level-rule min) to be selected as candidate rules. Further, in this example, predictive maintenance program 300 selects 20 rules with the highest relative confidence values as candidate rules.

Processing proceeds to operation S258, where uniform distribution determination mod 358 determines if candidate rules are uniformly distributed within undesired status data. A uniform distribution of a candidate rule indicates a likelihood that the candidate rule is influential and has a general applicability to the process. Predictive maintenance program 300 evaluates each candidate rule to determine if a candidate rule occurs on a specified percentage of entities when producing undesired status data. In some embodiments of the present invention, the specified percentage is established by a user. Alternatively, the specified percentage is established by general policy or by computer algorithm to automatically determine the specified percentage. The selected candidate rules are evaluated for having a significant presence in the undesired status data. In some embodiments, statistical methods are employed to determine a degree of significance of the presence. For example, a one-sample chi-squared test may be employed to determine if an occurrence of a candidate rule is equally distributed throughout each entity. A chi-squared test uses counts or frequencies of occurrence rather than means and standard deviations of the occurrences. It compares how many items actually fall into one category instead of another with respect to a hypothesized or expected count.

The Chi-squared test used with one sample is a method to measure fit of distributions. It is used to determine whether a distribution of frequencies for a variable in a sample is representative of a specified population distribution. Measures of fit summarize the discrepancy between observed values and the values expected under the model in question. The target frequency of occurrence of a candidate rule within collected data from an entity is specified to perform the chi-squared test. The resulting value can be compared to the chi-squared distribution to determine the degree of fit. In order to determine the degrees of freedom of the chi-squared distribution, the number of estimated parameters is subtracted from the total number of observed frequencies. According to some embodiments of the present invention, the minimum degree of fit is specified for use by predictive maintenance program 300. In this embodiment, predictive maintenance program 300 requires that candidate rules must occur on 75% of the entities producing undesired status data.

Continuing with the example, if the 20 candidate rules are present on all five tanks within the plant when producing undesired status data, predictive maintenance program 300 utilizes a one-sample chi-squared test to determine a uniform distribution of the 20 candidate rules based on a temperature sensor on each tank. Predictive maintenance program 300 specifies that a candidate rule must be distributed among all entities within a specified degree of fit. Predictive maintenance program 300 determines that 6 of the candidate rules are not uniformly distributed among the five entities within the specific degree of fit and 14 of the candidate rules are distributed among the five entities within the specific degree of fit. The six candidate rules are considered as not being uniformly distributed within undesired status data.

Processing proceeds to operation S260, where candidate rule exclusion mod 360 excludes candidate rules not being uniformly distributed within undesired status data. Any candidate rule not uniformly distributed according to operation S258 will not be considered as an influential rule that describes undesired status data. In this embodiment, the 6 candidate rules that were determined to not be uniformly distributed among the five tanks are excluded from being considered as an influential rule. This leaves 14 candidate rules for further evaluation as a sub-set of the candidate rules.

Processing proceeds to operation S262, where uniform distribution determination mod 358 determines if the sub-set of candidate rules are uniformly distributed within desired status data. Predictive maintenance program 300 evaluates if the candidate rule occurs on a specified percentage of entities with desired status. The specified percentage of entities with desired status may be set by a user or via computer determination. the sub-set of candidate rules are evaluated to see if they have a significant presence in the desired status data. Statistical methods may be employed to determine how significant of a presence candidate rules have in the desired status data. For example, a one-sample chi-squared test may be employed to determine if the candidate rule is equally distributed throughout each entity. The minimum degree of fit may be specified for predictive maintenance program 300. Predictive maintenance program 300 may specify that a candidate rule must be distributed among all entities within a specific degree of fit.

According to the example, predictive maintenance program 300 specifies that a candidate rule must be present on no more than 25% of the tanks when producing desired status data. The 14 remaining candidate rules are present on less than a quarter of all tanks when operating according to a desired status. Predictive maintenance program 300 utilizes a one-sample chi-squared test to determine uniform distribution across the five tanks (the temperature sensors on the five tanks). Predictive maintenance program 300 determines that 10 of the remaining candidate rules are not uniformly distributed among the five tanks within the specified degree of fit and 4 of the remaining candidate rules are distributed uniformly among the five tanks within the specified degree of fit. Therefore, four of the candidate rules are determined to be uniformly distributed within desired status data.

Processing proceeds to operation S264, where candidate rule exclusion mod 360 excludes candidate rules that are uniformly distributed within desired status data. Any candidate rule determined to be uniformly distributed in operation S260 will not be considered as an influential rule that describes undesired status data. The remaining candidate rules from the sub-set of candidate rules are a final sub-set of candidate rules for evaluation to be influential rules. In this example, the four candidate rules that were determined to be uniformly distributed among the five tanks when producing desired status data are not included in the final sub-set of candidate rules, leaving 10 candidate rules for further evaluation.

Processing proceeds to operation S266, where candidate rule significance determination mod 366 determines if candidate rules are significant with respect to undesired status data. The final sub-set of candidate rules are evaluated by comparing the presence of a candidate rule in both desired and undesired status data. Statistical methods support a determination of how significant the presence of the candidate rule is for undesired status data.

Continuing with the example, a one-sample chi-squared test is employed to determine if the rule is equally distributed throughout each entity. For another example, a minimum degree of fit is specified for predictive maintenance program 300. Rule distributions for an influential rule should not be similar for both desired and undesired status data. In this embodiment, predictive maintenance program 300 utilizes a one-sample chi-squared test to determine significance of rules based at least on the data collected by the temperature sensors on the five tanks. Predictive maintenance program 300 determines that two candidate rules of the final sub-set of 10 candidate rules are similar between desired and undesired status data within the specific degree of fit and 8 of the candidate rules are not similar among the five tanks within the specific degree of fit. The 2 candidate rules are determined to be not significant between desired and undesired status data. It should be noted that if the number of times one rule occurs for one entity producing desired status data is more than the sum of the number of rules occurring in all other entities, the process may still find that the one rule will cause an undesired result, that rule should not be considered as an influential rule.

Processing proceeds to operation S268, where candidate rule exclusion mod 360 excludes candidate rules not significant between desired status data and undesired status data. Any candidate rule determined to be not significant in operation S266 will not be considered as an influential rule that describes undesired status data. In this embodiment, the 2 candidate rules, that were determined to be not significant among the five tanks with desired status data and undesired status data, are excluded from being an influential rule, leaving 8 candidate rules identified as influential rules.

Processing proceeds to operation S270, where influential rules generation mod 370 generates influential rules and corresponding influential rates to establish a predictive maintenance process that monitors for the influential rules. The candidate rules not excluded by the candidate rule exclusion module are deemed influential rules. Influential rules those rules determined to be useful for predictive maintenance operations. Each influential rule has a corresponding influential rate. The influential rate is calculated using the following influential rate formula:

$$\text{Influential rate} = \frac{B_e}{B_t} \bigg/ \left( \frac{B_e}{B_t} + \frac{G_e}{G_t} \right),$$

where: $B_e$ is the number of entities with undesired status and the rule present, $B_t$ is the total number of entities with undesired status, $G_e$ is the number of entities with desired status and the rule present, and $G_t$ is the total number of entities with desired status. In this example embodiment, the 8 remaining candidate rules are generated as influential rules and are assigned a corresponding influential rate. The influential rate of each rule is calculated by the influential rules generation module according to the influential rate formula.

In some embodiments of the present invention, influential rules generated by influential rules generation mod 370 are supplied to a rules engine for automated predictive maintenance operations. Influential rules that result from the above-described process describe sequences of events that are generally applicable to a process for predicting a failure or an undesired result, also referred to herein as an error event. Continuing with the example, the eight influential rules represent generally applicable sequences of events that lead to an undesired temperature of a chemical in a tank. Accordingly, predictive maintenance program 300 monitors chemical processes in the five tanks for an occurrence of a sequence of events that match one of the eight influential rules. Upon detection of an influential rule being met, the temperature of the chemical in the tank is adjusted or, in some cases, monitored more closely than usual because the temperature is likely to become undesired. The final set of influential rules for use may be less than all the candidate rules deemed influential by the influential rules generation module. Such variation will be due to a pre-defined limit on the number of influential rules reported, or due to other considerations that have the effect of reduced total count of influential rules reported.

III. Further Comments and/or Embodiments

Some embodiments of the present invention recognize the following facts, potential problems, and/or potential areas for improvement with respect to the current state of the art. Sequence rule mining used for predictive maintenance generally assumes events occur sequentially. While many events tend to occur sequentially, sequential rule mining cannot handle the situation when a critical event occurs at one time and does not at others even when there is a similar sequential order in both cases. For example, an entity can report events A, B, C occurred sequentially and produced a "not normal" status, referred to above as "undesired" status. However, another entity reports events A, B, C occurred sequentially and produced a "normal" status, referred to above as "desired" status. In this example, sequential rule mining would have a difficult time predicting "not normal" or "normal" status for an entity that reports A, B, C occurring sequentially.

Some embodiments of the present invention may include one, or more, of the following features, characteristics, and/or advantages: (i) a supervised sequence rule mining method to recognize statistically significant patterns to recognize "not normal" or "normal" status; (ii) not simply pattern identification, but statistical analysis of critical events for pattern prediction; (iii) the timing between a critical event and a "not normal" status does not have to be considered for predictive maintenance; (iv) event patterns in "not normal" status data are identified; (v) the distribution of those event patterns in "not normal" status data produced by target entities drives determination of candidate patterns, or rules; (vi) influential rules are determined by analyzing "normal" status data for similar event patterns.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

What is claimed is:

1. A computer-implemented method for establishing a predictive maintenance process comprising:
    determining a target variable for a process to be performed by a plurality of entities, the target variable measured by a first sensor installed on the plurality of entities;
    collecting event data corresponding to each entity from a set of sensors including the first sensor while each entity performs the process, the event data including data time stamps;
    storing, in a database, the event data, data time stamps, and an associated entity from which the event data is collected;
    recording to the database a set of values of the target variable for each entity of the plurality of entities during the process, the values including value time stamps;
    assigning, in the database, data statuses to the event data according to time periods when target variable values for each entity reflects either a desired status or an undesired status;
    mining a set of undesired-status event data corresponding to each entity and assigned the undesired status for a first set of sequence rules, each sequence rule being based on a chronological order of data time stamps;
    mining a set of desired-status event data corresponding to each entity and assigned the desired status for a second set of sequence rules, each sequence rule being based on a chronological order of data time stamps;
    identifying within the set of undesired-status event data a set of candidate sequence rules having a uniform occurrence among the plurality of entities;
    identifying within the set of candidate sequence rules select sequence rules present in both the first and the second sets of sequence rules, the select sequence rules having a non-uniform occurrence among the plurality of entities according to the set of desired-status event data; and
    generating a set of influential rules and rates for a predictive maintenance process, the set of influential rules and rates including the select sequence rules.

2. The computer-implemented method of claim 1, wherein the plurality of entities are manufacturing devices.

3. The computer-implemented method of claim 1, wherein:
    the target variable is a process temperature; and
    the event data is at least collected from a temperature sensor.

4. The computer-implemented method of claim 1, wherein mining for a first set of sequence rules includes mining only three-event sequence rules.

5. The computer-implemented method of claim 1, wherein identifying the set of candidate sequence rules includes applying a one-sample-chi-square test to the set of sequence rules.

6. The computer-implemented method of claim 1, wherein identifying the select sequence rules includes determining a frequency of occurrence of the subset of sequence rules within the desired result data.

7. The computer-implemented method of claim 1, wherein the non-uniform occurrence of the select sequence rule is distributed outside a specified degree of fit.

8. The computer-implemented method of claim 1, further comprising:
    performing automated predictive maintenance operations according to the set of influential rules and rates by:
        monitoring the process performed by an entity of the set of entities for influential rule occurrences; and
        responsive to the occurrence of the influential rule, taking a predictive maintenance action on the entity.

* * * * *